(12) United States Patent
Wellman et al.

(10) Patent No.: US 10,046,818 B1
(45) Date of Patent: Aug. 14, 2018

(54) RUBBER TRACK WHEEL PATH REINFORCEMENT

(71) Applicant: ContiTech Transportbandsysteme GmbH, Hannover (DE)

(72) Inventors: Ronald Wellman, Coldwater, OH (US); Mohamad Bachir, Medina, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 15/823,650

(22) Filed: Nov. 28, 2017

(51) Int. Cl.
*B65G 15/34* (2006.01)
*B62D 55/24* (2006.01)

(52) U.S. Cl.
CPC ........... *B62D 55/244* (2013.01); *B65G 15/34* (2013.01); *B65G 2812/02198* (2013.01)

(58) Field of Classification Search
CPC ...... B62D 55/14; B62D 55/244; B62D 55/24; B62D 55/26; B65G 15/34
USPC ................ 198/847; 305/157, 165, 166, 173; 264/241
See application file for complete search history.

(56) References Cited

U.S. PATENT DOCUMENTS

| | | | |
|---|---|---|---|
| 3,732,767 A | 5/1973 | Habert | |
| 3,934,943 A | 1/1976 | Gage | |
| 4,216,856 A * | 8/1980 | Moring | B29C 70/202 156/181 |
| 4,410,082 A * | 10/1983 | McGinnis | B65G 15/34 198/818 |
| 5,536,464 A * | 7/1996 | Muramatsu | B29C 35/0277 156/140 |
| 2002/0140288 A1 | 10/2002 | Herberger, Sr. et al. | |
| 2003/0080618 A1 | 5/2003 | Krishnan et al. | |
| 2003/0094854 A1 | 5/2003 | Rodgers et al. | |
| 2003/0209941 A1* | 11/2003 | Peterson | B62D 55/244 305/170 |
| 2007/0046100 A1 | 3/2007 | McGilvrey et al. | |
| 2007/0126286 A1* | 6/2007 | Feldmann | B62D 55/244 305/165 |
| 2008/0136255 A1 | 6/2008 | Feldmann | |
| 2009/0200863 A1* | 8/2009 | Sugihara | B62D 55/253 305/169 |
| 2010/0096915 A1* | 4/2010 | Hagio | B62D 55/244 305/165 |
| 2017/0313368 A1* | 11/2017 | Peterson | B62D 55/244 |

* cited by examiner

*Primary Examiner* — James R Bidwell
(74) *Attorney, Agent, or Firm* — David L. Cate

(57) ABSTRACT

An endless rubber track belt includes an endless, elongate carcass having an outer surface, an inner surface, and at least one reinforcing layer. The inner surface defines a plurality of wheel path areas. A plurality of tread lugs are disposed on the outer surface. A plurality of guide lugs are disposed on the inner surface, where each guide lug includes oppositely disposed drive faces, an upper face between said drive faces, and oppositely disposed end faces. At least one reinforcement strip is disposed inward from the inner surface and outward from the at least one reinforcement layer. The at least one reinforcement strip is positioned adjacent the plurality of wheel path areas. The at least one reinforcement strip may include a bias ply formed of two layers of cords arranged in opposite +/− bias angles. The +/− bias angles may range from about +/−20° to about +/−80°.

20 Claims, 5 Drawing Sheets

RUBBER TRACK WHEEL PATH REINFORCEMENT

FIELD

The field to which the disclosure generally relates to is belts, and more particularly, conveyor belts and endless track belts.

BACKGROUND

This section provides background information to facilitate a better understanding of the various aspects of the disclosure. It should be understood that the statements in this section of this document are to be read in this light, and not as admissions of prior art.

Positive drive or friction drive, endless rubber tracks such as those used on agricultural or industrial vehicles typically have wheel paths on the inner side of the tracks, which are in contact with various wheels included in a track assembly. For rubber track applications with high loads, the wheel path areas of the track have high loads exerted thereon by the supporting roller wheels. These high vertical loads create dangerously high compressive loads on the tracks internal components as well as high stress loads as the roller wheels roll along the wheel path, during the movement of the track. In some cases, this contact can cause premature wearing of the wheels, wheel path areas of the track, which can be severe, depending upon various vehicle design features and application use. Such high forces on the wheels and wheel path areas, can lead to delamination of rubber from reinforcing members within the endless track, which then may result in separation of reinforcing members from the carcass, ultimately rendering the track useless. The same can be the case for conveyor belts.

Thus, belts, such as track belts or conveyor belts, having wheel path areas which have more resistance to separation of main cables from rubber portions is desired, such need met at least in part by embodiments according to this disclosure.

SUMMARY

This section provides a general summary of the disclosure, and is not a necessarily a comprehensive disclosure of its full scope or all of its features.

In a first aspect of the disclosure an endless rubber track belt is provided which includes an endless, elongate carcass having an outer surface, an inner surface, and at least one reinforcing layer. The inner surface defines a plurality of wheel path areas. A plurality of tread lugs are disposed on the outer surface. A plurality of guide lugs are disposed on the inner surface, where each guide lug includes oppositely disposed drive faces, an upper face between said drive faces, and oppositely disposed end faces. At least one reinforcement strip is disposed inward from the inner surface and outward from the at least one reinforcement layer. The at least one reinforcement strip is positioned adjacent to the plurality of wheel path areas. The at least one reinforcement strip may include a bias ply formed of two layers of cords or wires arranged in opposite +/− bias angles. The +/− bias angles may range from about +/−20° to about +/−80°. In some cases, the +/− bias angles range from about +/−30° to about +/−70°, while in other cases, the +/− bias angles range from about +/−40° to about +/−60°. In some aspects, the layers of cords are nylon tire cord. Also, the bias ply may be covered on both sides with a skim coat layer of rubber. In some aspects, the least one reinforcement strip imparts a normalized strain value of less than 0.900, or even less than 0.750.

In another aspect of the disclosure a conveyor belt includes a reinforcement layer, a carry cover layer above the reinforcement layer, and a pulley cover layer beneath the reinforcement layer. The pulley cover layer has a surface which defines a plurality of wheel path areas. At least one reinforcement strip disposed inward from the surface of the pulley cover layer and outward from the reinforcement layer. The at least one reinforcement strip is positioned adjacent the plurality of wheel path areas. The at least one reinforcement strip may include a bias ply formed from two layers of cords arranged in opposite +/− bias angles. The +/− bias angles may range from about +/−20° to about +/−80°, from about +/−30° to about +/−70°, or even from about +/−40° to about +/−60°. In some aspects, the at least one reinforcement strip imparts a normalized strain value of less than 0.900, or even less than 0.750.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
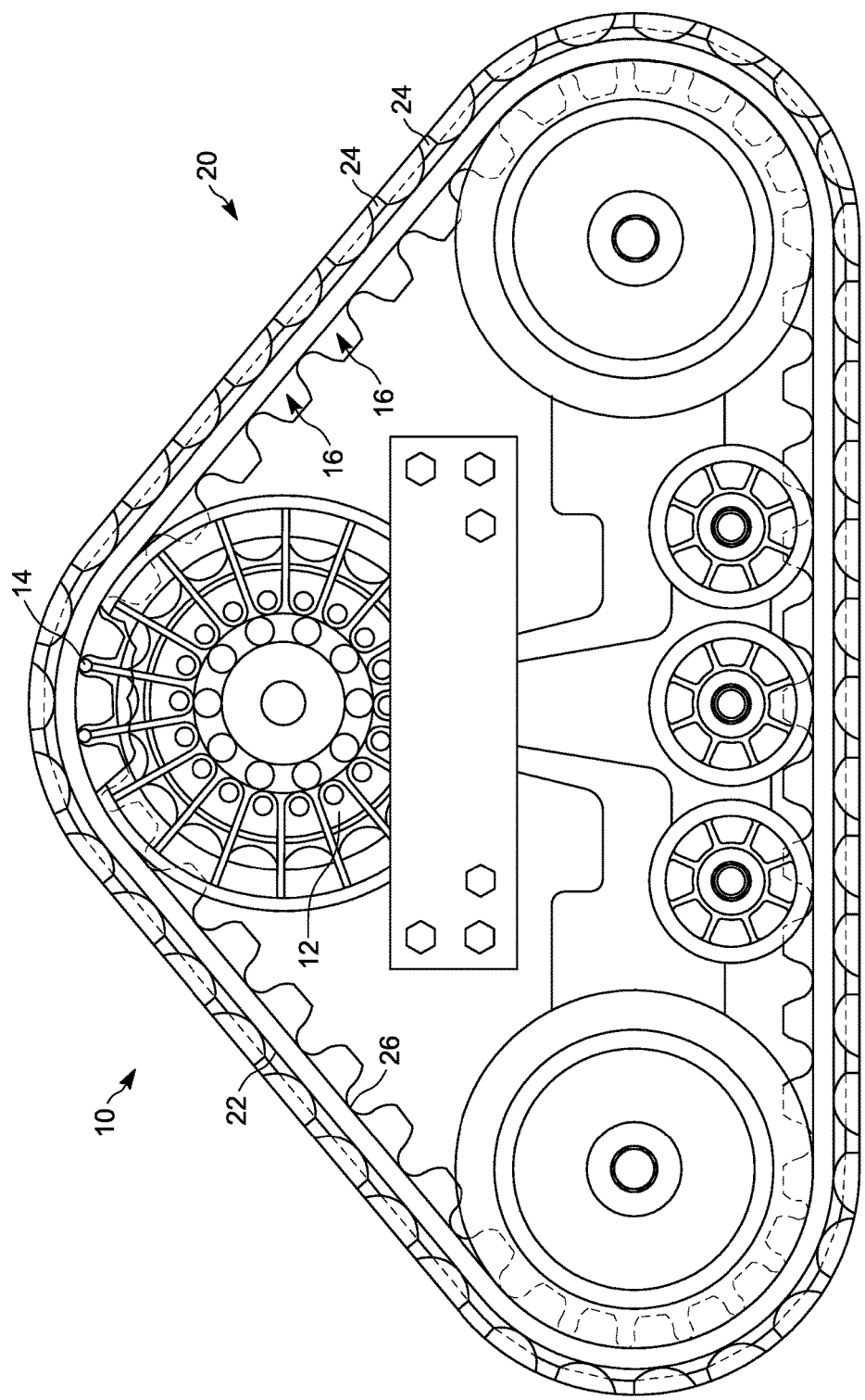
FIG. 1 is a side view of a track assembly according to the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure are generally belts having a carcass which includes an outer surface, an inner surface, and at least one reinforcing layer. The inner surface defines a plurality of wheel path areas and at least one reinforcement strip is disposed inward from the inner surface and outward from the at least one reinforcement layer. The number of reinforcement strips is not limiting, and any suitable number of reinforcement strips is within the scope of the disclosure. As such, one reinforcement strip, two reinforcement strips, four reinforcement strips, etc., could be used. The at least one reinforcement strip is positioned adjacent the plurality of wheel path areas. In some cases, the at least one reinforcement strip comprises a bias ply formed of two layers of cords arranged in opposite +/− bias angles. In some aspects the at least one reinforcement strip imparts a normalized strain value of less than 0.900.

Now referencing FIG. 1, which illustrates a track assembly 10 which may be used on an industrial or agricultural vehicle (not shown). The track assembly 10 includes a drive wheel 12 including a plurality of teeth or drive bars 14 that are positioned for mating engagement with guide lugs 16. The guide lugs 16 are mounted on a rubber track 20 having an endless elongate carcass. The endless track carcass has an outer surface 22 including a plurality of ground engaging tread lugs 24 and an inner surface 26 with a plurality of guide lugs 16, typically located on the center portion of the carcass.

Figure 2:
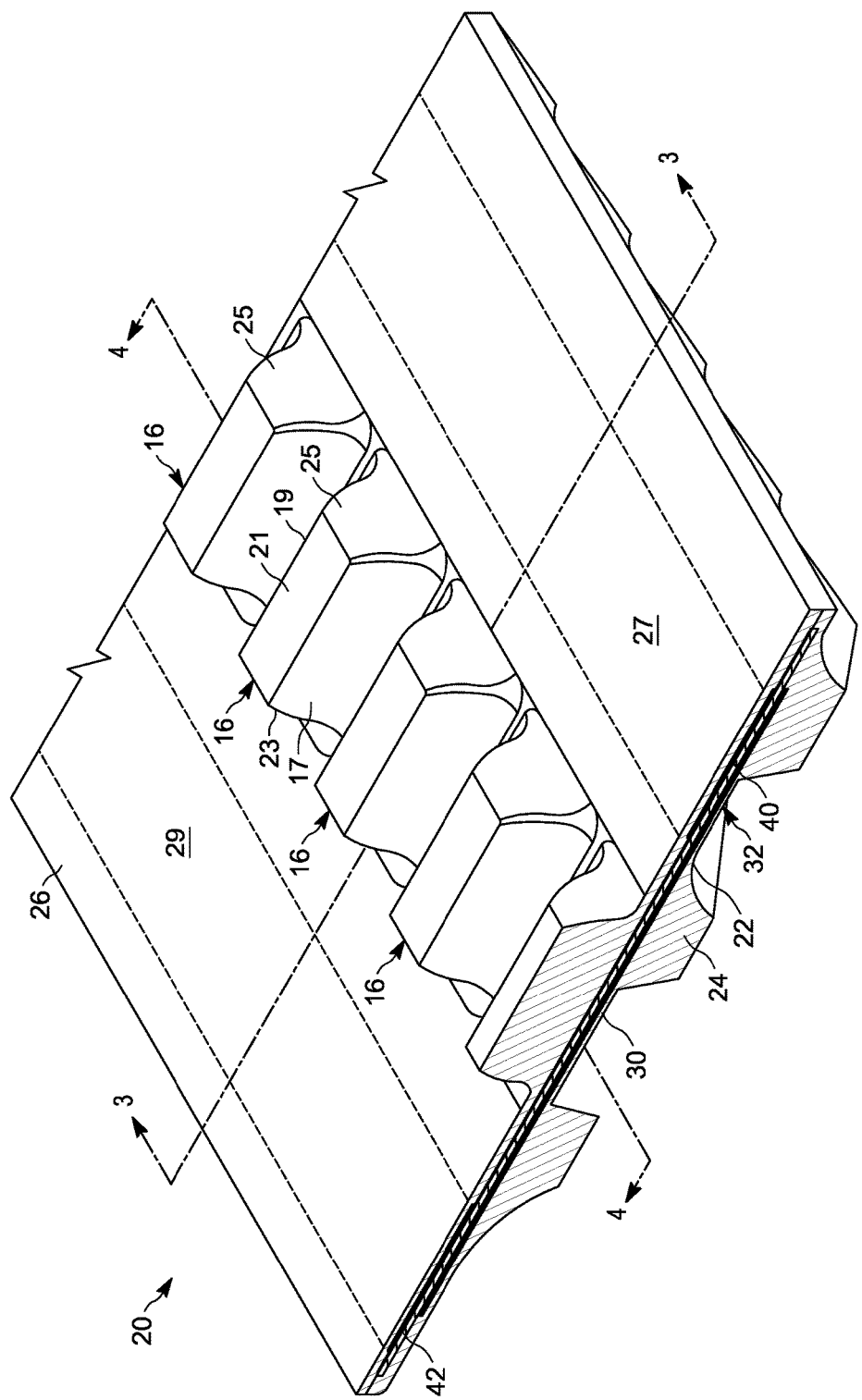
FIG. 2 is a cut away perspective view of endless vehicle track belt according to the disclosure.

As shown in FIG. 2, each guide lug 16 includes an elongate shaped bar with inclined drive faces 17, 19, and an upper flat face 21. The corners of the joined faces are rounded to reduce stress concentrations. The guide lugs 16 may also have various other shapes. Rubber track 20 also includes wheel path areas 27 and 29 as part of inner surface 26. Wheel path areas 27 and 29 are generally located outward from guide lugs 16. Disposed within the endless track carcass of rubber track 20 are reinforcement strips 40 and 42, beneath inner surface 26 wheel path areas 27 and 29, respectively.

Figure 3:
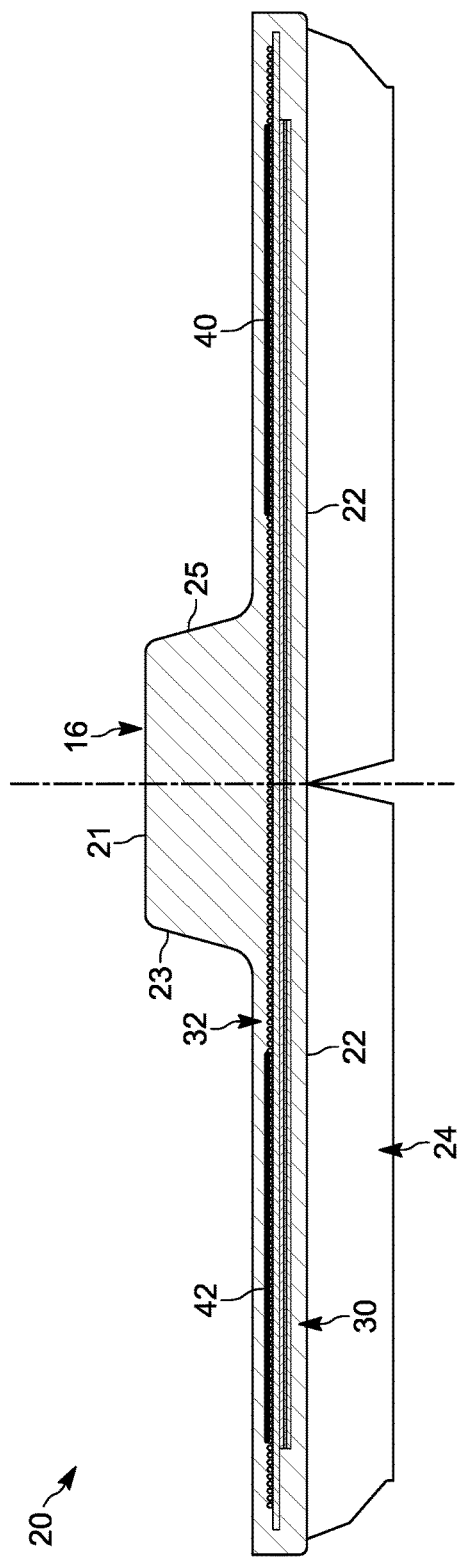
FIG. 3 is a cross-sectional view of endless vehicle track belt according to the disclosure.
Figure 4:
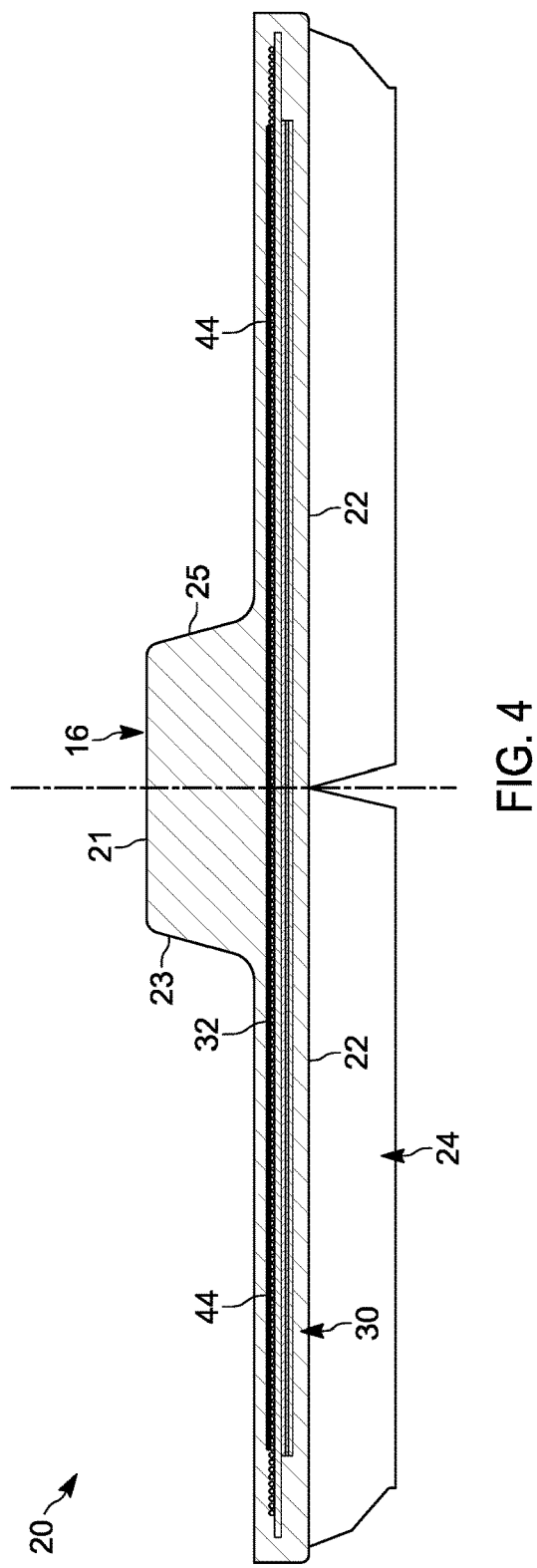
FIG. 4 is a cross-sectional view of another endless vehicle track belt according to the disclosure.

As shown in FIGS. 3 and 4, the carcass of belt 20 typically includes one or more layers of gum rubber or elastomeric material 30. Embedded within the gum rubber or elastomeric material 30 are one or more reinforcement layers 32 which extend transversely along the track width. The reinforcement layers 32 may comprise longitudinal cable reinforcement layers, fabric reinforcement layers, or any other reinforcement layer known to those skilled in the art. FIG. 4 depicts an embodiment according to the disclosure where a reinforcement strip 44 extends transversely beneath inner surface 26 from wheel path area 27 to wheel path area 29.

The reinforcement strips 40, 42 and 44 may include any suitable material, such as, but not limited to, nylon, polyester, polyethylene, polyurethane, rayon, Kevlar, aramid, metal, natural fibers such as cotton, glass fibers, carbon fibers, ceramic fibers, or plastic fibers. The reinforcement strip material may also be a fiber loaded rubber layer, with fibers oriented in a transverse direction or in a random direction. For example, the reinforcement strip material may be tire ply made of nylon cord, steel wire, or any other suitable cord material. The tire cord may be bias cut applied at any suitable angle, such as +/−10, +/−20, +/−30, +/−40, +/−45, +/−50, +/−60, +/−70, +/−80, +/−90 degrees, or any point there between. In some aspects, the bias angles may be unequal; for example, but not limited to, +45/−50, −45/+50, +35/−60, etc., or the like.

Plies used in some reinforcement strips may have equal or unequal ends per inch (epi). As an example, one ply could have 12 epi and the other ply could have 7 epi. Plies forming some reinforcing strips may be made from one material, or even several materials. For example, the plies may all be steel, or steel cord next to aramid cord (alternating). Also, plies forming some reinforcing strips could be of a merged or hybrid cord construction. For example, steel and aramid elements could be twisted together to form a cord.

The tire cord is generally applied in two layers of opposite angles. As shown above, the reinforcement strip material may be embedded under the track inner surface at a distance, the distance typically being in the range of about 0.020 inch to about 0.130 inch, but not necessarily limited thereto. In some aspects, the reinforcement strip(s) is covered on both sides with a skim coat layer of rubber.

Use of bias plies of wire treatment or fabric as a reinforcement strip in the wheel path areas of belts according to the disclosure, where the roller wheel loads are experienced can spread the loads both laterally and longitudinally and thus reduce the stress in the further underlying reinforcement layers. The bias ply reinforcement creates lower strain in the direction of the underlying one or more reinforcement layers 32, thus reducing heat generation. Table 1 below, generated by Abaqus analysis, demonstrates how such lower strain transmittance by incorporation of bias reinforcement strips beneath the inner surface in wheel path areas.

TABLE 1

| Carcass Construction Description | Strain, normalized |
|---|---|
| Conventional (no reinforcement strips) | 0.924 |
| +/−10° Bias Reinforcement Strips | 1.000 |
| +/−20° Bias Reinforcement Strips | 0.843 |
| +/−40° Bias Reinforcement Strips | 0.715 |
| +/−50° Bias Reinforcement Strips | 0.686 |
| +/−60° Bias Reinforcement Strips | 0.724 |

TABLE 1-continued

| Carcass Construction Description | Strain, normalized |
|---|---|
| +/−70° Bias Reinforcement Strips | 0.823 |
| +/−80° Bias Reinforcement Strips | 0.890 |
| +/−90° Bias Reinforcement Strips | 0.930 |

Figure 5:
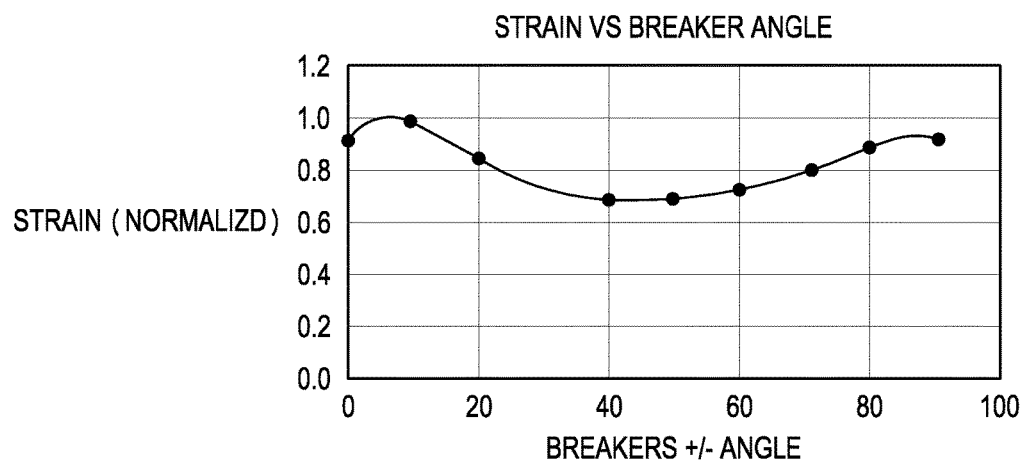
FIG. 5 illustrates a correlation between normalized strain values and +/− bias angle for reinforcement strip(s) used in some belts according to the disclosure; and, FIG. 6 is a cross-sectional view of conveyor belt according to the disclosure.

Hence, a correlation between strain values, normalized, and +/− bias angle may be made, which is shown in FIG. 5. Generally, a lower strain value translates into reduced strain in the direction of the underlying one or more reinforcement layers 32, as well as reduced heat generation. In some aspects of the disclosure, belts include reinforcement strip(s) having cords applied in two layers of opposite +/− bias angles, as described above. The +/− bias angles may range from about +/−20° to about +/−80°, from about +/−30° to about +/−70°, or even from about +/−40° to about +/−60°. While +/− bias angles are expressed, it should be understand that −/+ bias angles are within the scope of the disclosure, and any angle value, or range of values disclosed, will be considered +/− or −/+.

The reinforcement strips may be incorporated into the belt during the belt manufacturing process. In such cases, the reinforcement strip(s) is prepared independently, and prior to, the belt manufacturing process. The reinforcement strip(s) is/are placed as a layer beneath the inner surface of the belt prior to curing, when the belt is in a so called green state. The belt can be formed and vulcanized in a pressurized molding process. Some molds used in the process have shaped lug cavities which form guide lugs into their intended final shape, for track belts. Guide lugs can be presented to the final molding process as extruded pieces, which are cut to length, approximately the shape of the lug cross sectional contour. At the end they may be cut on a bias to more approximate the ends of the mold cavities. Otherwise, the lugs may be pre-molded similar to what is illustrated in U.S. Pat. No. 5,536,464, incorporated herein by reference. After the reinforcement strip(s) has been fitted into the green belt, final vulcanization occurs via imparting appropriate pressure and temperature onto the uncured belt. This is the final step in incorporating the reinforcement strip into the belt.

While the above description illustrates some embodiments of the disclosure which are endless vehicle tracks, the same concepts could be applied to other heavy duty belts. For example, a conveyor belt could have the reinforcement strip(s) incorporated inward from a pulley cover layer surface, which is opposite the load carrying upper carry cover layer surface. Such an arrangement is depicted in FIG. 6.

Figure 6:
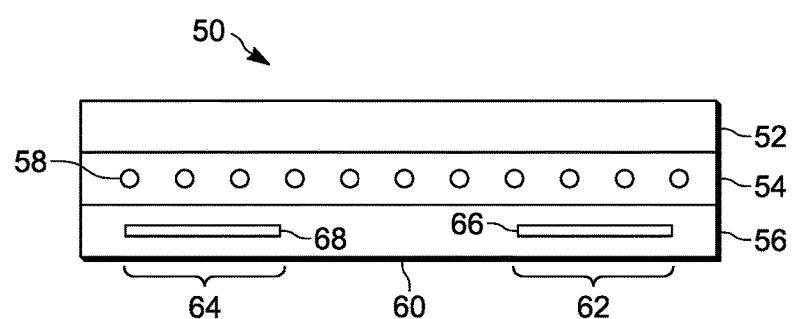

In FIG. 6, conveyor belt 50 includes an upper carry cover layer 52, a reinforcement layer 54, and pulley cover layer 56. The upper carry cover layer 52 is positioned above the reinforcement layer 54 (which can be constructed of a single ply or multiple plies) with the pulley cover layer 56 being positioned below the reinforcement layer 54. In this fundamental design the reinforcement layer 54 is accordingly situated between the carry cover layer 52 and the pulley cover layer 56.

The upper carry cover layer 52, reinforcement layer 54 and pulley cover layer 56 may be manufactured using materials and methods well known in the art. The reinforcement layer 54 may utilize a plurality of steel cables 58 (to reinforce the conveyor belt and to provide it with strength and durability. The reinforcement layer 54 may as an alternative to or in conjunction with the steel cables utilize fabric or polymer reinforcement components. For instance, the reinforcement layer 54 may be constructed of one or more plies of a polymeric fiber. The fabric can optionally be formed of materials such as aramid, polyester, or nylon, or any suitable mixture thereof.

Pulley cover layer 56 has surface 60 which defines wheel path areas 62 and 64. Inward from surface 60 adjacent wheel path areas 62 and 64 are reinforcement strips 66 and 68. Reinforcement strips 66 and 68 may be designed and constructed in the manners reinforcement strips 66 and 68 disclosed above, using like materials. Also, while two reinforcement strips 66 and 68 are shown in FIG. 6, similar to FIG. 4 above, one reinforcement strip may be utilized in some aspects.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An endless rubber track belt comprising:
   an endless, elongate carcass including an outer surface, an inner surface, and at least one reinforcing layer, wherein the inner surface defines a plurality of wheel path areas;
   a plurality of tread lugs disposed on the outer surface;
   a plurality of guide lugs disposed on the inner surface, each of the plurality of guide lugs including oppositely disposed drive faces, an upper face between the drive faces, and oppositely disposed end faces; and,
   at least one reinforcement strip disposed inward from the inner surface and outward from the at least one reinforcement layer, wherein the at least one reinforcement strip is positioned adjacent the plurality of wheel path areas;
   wherein the at least one reinforcement strip comprises a bias ply comprising two layers of cords arranged in opposite +/− bias angles, and wherein the +/− bias angles range from about +/−20° to about +/−80°.

2. The endless rubber track belt according to claim 1, wherein the +/− bias angles range from about +/−30° to about +/−70°.

3. The endless rubber track belt according to claim 2, wherein the +/− bias angles range from about +/−40° to about +/−60°.

4. The endless rubber track belt according to claim 1, wherein layers of cords comprise nylon tire cord.

5. The endless rubber track belt according to claim 1, wherein the bias ply is covered on both sides with a skim coat layer of rubber.

6. The endless rubber track belt according to claim 1, wherein the at least one reinforcement strip imparts a normalized strain value of less than 0.900.

7. The endless rubber track belt according to claim 6, wherein the at least one reinforcement strip imparts a normalized strain value of less than 0.750.

8. A belt comprising:
   carcass including an outer surface, an inner surface, and at least one reinforcing layer, wherein the inner surface defines a plurality of wheel path areas; and,
   at least one reinforcement strip disposed inward from the inner surface and outward from the at least one reinforcement layer, wherein the at least one reinforcement strip is positioned adjacent the plurality of wheel path areas;
   wherein the at least one reinforcement strip comprises a bias ply comprising two layers of cords arranged in opposite +/− bias angles, wherein the +/− bias angles range from about +/−20° to about +/−80°, and wherein the at least one reinforcement strip imparts a normalized strain value of less than 0.900.

9. The belt according to claim 8, wherein the +/− bias angles range from about +/−30° to about +/−70°.

10. The belt according to claim 9, wherein the +/− bias angles range from about +/−40° to about +/−60°.

11. The belt according to claim 8, wherein layers of cords comprise nylon tire cord.

12. The belt according to claim 8, wherein the bias ply is covered on both sides with a skim coat layer of rubber.

13. The belt according to claim 8 wherein the at least one reinforcement strip imparts a normalized strain value of less than 0.750.

14. A conveyor belt comprising:
   a reinforcement layer, a carry cover layer above the reinforcement layer, and a pulley cover layer beneath the reinforcement layer, wherein the pulley cover layer has a surface which defines a plurality of wheel path areas; and,
   at least one reinforcement strip disposed inward from the surface of the pulley cover layer and outward from the reinforcement layer, wherein the at least one reinforcement strip is positioned adjacent the plurality of wheel path areas;
   wherein the at least one reinforcement strip comprises a bias ply comprising two layers of cords arranged in opposite +/− bias angles, and wherein the +/− bias angles range from about +/−20° to about +/−80°.

15. The conveyor belt according to claim 14, wherein the +/− bias angles range from about +/−30° to about +/−70°.

16. The conveyor belt according to claim 15, wherein the +/− bias angles range from about +/−40° to about +/−60°.

17. The conveyor belt according to claim 14, wherein layers of cords comprise nylon tire cord.

18. The conveyor according to claim 14, wherein the bias ply is covered on both sides with a skim coat layer of rubber.

19. The conveyor according to claim 14, wherein the at least one reinforcement strip imparts a normalized strain value of less than 0.900.

20. The conveyor according to claim 19, wherein the at least one reinforcement strip imparts a normalized strain value of less than 0.750.

* * * * *